[11] 3,584,686

[72] Inventor Richard S. Fulford
Tulsa, Okla.
[21] Appl. No. 883,332
[22] Filed Dec. 8, 1969
[45] Patented June 15, 1971
[73] Assignee Cities Service Oil Company
Continuation-in-part of application Ser. No. 664,303, Aug. 30, 1967, now abandoned.

[54] PREVENTION OF CALCIUM SULFATE SCALE IN A WATERFLOODING PROCESS
12 Claims, No Drawings
[52] U.S. Cl. .................................................. 166/275, 166/305
[51] Int. Cl. ........................................... E21b 43/20
[50] Field of Search ............................. 166/268, 273—275, 305

[56] References Cited
UNITED STATES PATENTS

| | | | |
|---|---|---|---|
| 3,087,539 | 4/1963 | Maurer.......................... | 166/275 X |
| 3,091,291 | 5/1963 | Little et al. ................... | 166/275 X |
| 3,175,610 | 3/1965 | Osoba ........................... | 166/270 |
| 3,227,210 | 1/1966 | Trantham...................... | 166/273 X |
| 3,251,412 | 5/1966 | Cooke et al................... | 166/275 |
| 3,258,071 | 6/1966 | Shen et al. .................... | 166/275 |
| 3,414,053 | 12/1968 | Treiber et al. ................. | 166/273 |

FOREIGN PATENTS

| | | | |
|---|---|---|---|
| 709,209 | 5/1965 | Canada ......................... | 166/275 |

OTHER REFERENCES

Frick, Thomas C. PETROLEUM PRODUCTION HANDBOOK, Vol. II. N.Y., McGraw-Hill, 1962. pp. 41-66 thru 41-68. (Copy in Group 350).

Ostroff, A. G. " Compatibility of Waters for Secondary Recovery" in PRODUCERS MONTHLY, Mar. 1963, pp. 2, 4— 9.

*Primary Examiner*—Ian A. Calvert
*Attorney*—J. Richard Geaman

ABSTRACT: A method of minimizing the deposits of calcium sulfate near the production well during the process of secondary oil recovery by waterflooding utilizing an injection fluid whose mineral content has been supplemented by the addition of salts. In order to prevent calcium sulfate from precipitating near the reduced pressure area of the production wellbore during waterflooding the total mineral salt content of the fluid drive is adjusted to a high enough concentration so that the solubility of $CaSO_4$, which dissolves in the fluid drive as it passes through the formation, does not decrease as the pressure on the waterflood decreases. Sodium chloride may be taken alone or in combination with controlled amounts of mineral salts, such as calcium chloride, sodium sulfate, magnesium chloride, or sodium bicarbonate to adjust the mineral content of the fluid drive.

PREVENTION OF CALCIUM SULFATE SCALE IN A WATERFLOODING PROCESS

This application is a continuation-in-part of copending application, Ser. No. 664,303, filed Aug. 30, 1967 now abandoned.

This invention relates to the prevention of the formation of calcium sulfate scale which may occur during the waterflooding of a formation for the secondary recovery of petroleum. More directly it relates to a method for conditioning a water drive prior to injection during the secondary recovery operation so as to prevent calcium sulfate scaling in the vicinity of the production well.

Water injected into a formation to produce petroleum remaining in a formation after the primary recovery of an underground reservoir may become supersaturated with calcium sulfate as it drives through the reservoir at high pressure. As the flood approaches the vicinity of the producing oil well, initial pressures are diminished, and the calcium sulfate solubility is reduced. At this point calcium sulfate begins to precipitate out and form scale deposits. This scale impedes the flow of fluids and often so completely shuts off the wellbore that no petroleum can be produced.

The prior solution to scale prevention or removal fall into two convenient categories, physical and chemical. The physical removal of scale may be accomplished by drilling the deposited scale out of the wellbore. However, this procedure is expensive and production time is lost during the drilling. Scale that has been deposited in the production reservoir itself can not be removed in this manner. An alternate physical treatment that has been proposed involves the hydraulic fracturing of the reservoir in order to bypass the scale that has been previously formed. It should be noted that this method cannot be adapted to bypass the scale that has been formed in the wellbore.

Chemical treatment of the production wellbore with phosphates or polyacrylamides has been implemented to prevent scale from initially forming. Shen, U.S. Pat. No. 3,258,071 describes the use of these chemicals to minimize precipitation of insoluble metal compounds in flooding waters. Chemicals are placed in the wellbore or forced into the oil reservoir in order to prevent the scale from precipitating out. This method of treatment has two serious drawbacks. First, if the chemical is introduced into the wellbore, it will tend to mix with fluids at the top of the wellbore, and therefore, will not mix well with the fluid which enters the bottom of the wellbore. Consequently, chemicals are relatively ineffective in preventing scale from forming at the bottom of the wellbore where scaling occurs most readily. Secondly, in order to prevent scale formation in the reservoir, chemicals must be introduced into the particular zones of the reservoir in which scaling normally occurs. This procedure has had little success, since it is difficult to force chemicals selectively into those zones where scaling occurs most rapidly. Too often the chemicals are forced into regions where scaling does not occur.

Numerous pretreating methods exist for the preferential lowering of the interfacial tension of the surface-active insoluble bivalent cations $Ca_{++}$ and $Mg_{++}$. What is required, however, is a method by which the flooding media is capable of preventing bivalent cation precipitation as the flooding media reaches the vicinity of the production well, thereby preventing scale buildup in and resulting production loss from the well.

It is an object of this invention to provide an improved method for recovering petroleum from underground formations by waterflooding.

It is another object of this invention to provide a method for preventing the precipitation of calcium sulfate near the reservoir of a production well during the secondary recovering of petroleum by means of waterflooding.

It is another object of this invention to provide a method for preventing the formation of gypsum scale in the vicinity of a production wellbore during the secondary recovery of petroleum by controlling the salt concentration and quality in the flooding media.

These and other objects and advantages of the present invention will become apparent from the following detailed description of the invention.

SUMMARY OF THE INVENTION

The objects set forth above are obtained when sufficiently large amounts of water soluble salts are added to the flooding media prior to injection so that the total volume of the flooding media does not decrease when calcium sulfate present in the underground formation dissolves therein. It is preferred that the concentration of water soluble salts dissolved in the injection fluid or flooding media be within the range of from about 240 grams per liter to its saturation point in the injection fluid. Under these conditions the solubility of calcium sulfate, determined during its initial dissolution in the flooding media, for example in a water drive at elevated pressure, will not change when the pressure exerted on the waterflood decreases as the water drive moves away from an injection well toward a production well. Consequently, gypsum or calcium sulfate scale will not precipitate out from the waterflood and the formation of scale at the production well will be minimized. Generally, when the concentration of salt is below about 240 grams per liter the formation of gypsum scale may be observed. As the concentration of water soluble salts in the injection fluid is continually decreased below about 240 grams per liter, an ever increasing amount of scale will be deposited.

Flooding media salt concentrations mentioned above may consist of brine produced from other formations. Should these brines have a high bivalent metallic chloride concentration they may be enhanced for use as flooding media by the addition of sodium bicarbonate or by the removal of the bivalent metallic chlorides and addition of other water soluble salts should the resulting salt concentration be below the desired 240 grams per liter concentration.

DETAILED DESCRIPTION OF THE INVENTION

In the preferred embodiments of the invention, the water soluble salt is sodium chloride. It may be added to the flood, alone, or in combination with other mineral salts. If brine is available, it may be used as the injection fluid and additional salt may be added in order to reach the minimum desired total salt concentration of about 240 grams per liter, provided the concentration of sodium chloride is adjusted to at least about 170 grams per liter. The brine solutions often associated with drilling operations may be utilized as fluid drives. These brine solutions are generally not sufficiently concentrated for immediate use. Occasionally, concentrated brine (20 percent NaCl by weight) is available at a well site. In this event, no sodium chloride need be added to reach the preferred injection concentration of about 170 grams per liter. The minimum salt concentration is easily adjusted to about 240 grams per liter.

It has been observed that when sodium chloride is added to the fluid drive in conjunction with other mineral soluble salts, the most effective concentration of sodium chloride for retarding gypsum scale formation has been at least about 170 grams per liter, and the minimum total concentration of salts in the injection fluid has been at least about 240 grams per liter. Other water soluble salts that have been used in conjunction with sodium chloride include sodium sulfate, calcium chloride, sodium bicarbonate and magnesium chloride.

The following examples are given to further illustrate the practice of the present invention:

EXAMPLE

Salt water solution was placed with calcium sulfate under 1950 p.s.i.g. pressure and at a controlled temperature ranging from 25—40° C. for 5 to 7 days, until solubility equilibrium was reached. The excess undissolved calcium sulfate was separated from the solution and the pressure released. The amount of calcium sulfate that precipitated out of solution was measured as the difference between the amount of calcium sulfate in solution immediately before the pressure decrease and the amount in solution was measured by ethylenediaminetetracetic acid titration of the dissolved calcium. The salt concentrations in the following table are given in grams per liter and the amount of scale formed at the constant temperature of 34° C. is given in milligrams per liter.

SALT CONCENTRATIONS

[grams/liter]

| NaCl | CaCl₂ | Na₂SO₄ | MgCl₂ | NaHCO₃ | Distilled H₂O, percent | Total salts | Amount of scale formed (34° C.) milligrams/ liter of CaSO₄ |
|------|-------|--------|-------|--------|------------------------|-------------|------------------------------------------------------------|
|      |       |        |       |        | 100                    |             | 400                                                        |
| 5.0  |       | 4.5    | 0.3   |        |                        | 9.8         | 568                                                        |
| 36.0 |       |        | 0.4   |        |                        | 36.4        | 1,055(1)                                                   |
| 57.0 | 18.0  |        | 4.0   | 0.3    |                        | 79.3        | 462                                                        |
| 160.0|       |        |       |        |                        | 160.0       | 560                                                        |
| 177.0| 47.0  |        |       |        |                        | 224.0       | 127                                                        |
| 170.0| 47.0  |        | 12.0  | 0.7    |                        | 229.7       | 69                                                         |
| 171.0|       | 63.0   |       |        |                        | 234.0       | 0                                                          |
| 244.0|       |        |       |        |                        | 244.0       | 0                                                          |

(1) Water obtained from an oil reservoir where calcium sulfate scale is known to occur.

As the tabulated results indicate, when the salt concentration is about 240 grams per liter, the amount of scale formed is reduced to zero. It is also readily seen that where sodium chloride is incorporated in combination with other salts in the waterflood, a marked reduction is observed in the amount of scale deposited as compared to a waterflood whose salt concentration is below 240 grams per liter.

It has been found that although a total salt concentration of about 240 grams per liter or greater with at least about 170 grams per liter of sodium chloride will satisfactorily control the formation of gypsum scale, lesser amounts of total salt which do not contain adverse bivalent metallic cations such as calcium chloride or magnesium chloride which aid gypsum formation will also adequately control scale formation. Therefore, it is a preferred embodiment of the present invention to decrease or neutralize the bivalent metallic chloride concentration of the treatment flooding media.

Numerous methods for removing or neutralizing the adverse bivalent metallic chloride concentration of the flooding media are available. For example, a water soluble metallic hydroxide solution, such as barium hydroxide, may be added to the flooding media before it is introduced into the reservoir so as to remove insoluble bivalent metal hydroxide precipitates, such as calcium and magnesium hydroxide, within a surface installation. Boiling with ammonium oxalate or treatment with disodium hydrogen phosphate in the presence of ammonium hydroxide and numerous other treatment techniques will become apparent to those knowledgeable in the art.

I have also found that the adverse effects of bivalent metallic chloride containing flooding media with total salt concentrations less than about 240 grams per liter may be partially neutralized by the addition of small quantities of sodium bicarbonate. The presence of a bicarbonate appears to buffer the flooding media so that the preferred bivalent metal cation equilibrium is towards the formation of the chloride rather than the scale producing sulfate. Therefore, by adding small quantities of a bicarbonate, for example sodium bicarbonate, to the treated flooding media one may reduce the adverse effects of the presence of the bivalent metallic chlorides. Typical bicarbonate concentrations applied would be about 0.5 to 5.0 grams per liter.

Other salt concentrations, for example sodium sulfate may be used in conjunction with sodium chloride solutions of at least 170 grams per liter. Generally a concentration of at least about 63 grams per liter of sodium sulfate is sufficient in the above-mentioned solution. It has been found when injection fluids are employed using potassium chloride, it is preferred that KCl concentration be below 100 grams per liter and that another salt such as sodium chloride be employed in a concentration such that the total salt concentration of the injection fluid is at least about 240 grams per liter.

The present invention provides a significant advance in the prevention of gypsum scale in the vicinity of production wells during waterflooding operations. It provides a simplified and economic process by which the precipitation of calcium sulfate scale may be restrained or totally prevented. The method may be utilized in conjunction with present waterflooding media to enhance the performance thereof, or by introducing a suitable flooding media for reservoirs which previously were determined unsuitable for waterflooding operations due to uncontrollable gypsum formation.

While the invention has been described above with respect to certain embodiments thereof, it will be understood by those skilled in the art that various changes and modifications may be made without departing from the spirit and scope of the invention:

Therefore, I claim:

1. In a process for the secondary recovery of oil comprising injecting an aqueous fluid drive, having at least about 240 grams per liter water soluble mineral salt concentration, into an oil reservoir having a calcium sulfate content and simultaneously producing displaced oil from a production well, the improvement which comprises including within the aqueous fluid drive at least about 170 grams per liter sodium chloride and at least about 63 grams per liter sodium sulfate to minimize calcium sulfate deposition in the reservoir and production well.

2. In a process for the secondary recovery of oil comprising injecting brine from a subterranean formation, such brine containing an adverse bivalent metallic chloride concentration which aids gypsum formation and having at least about a 240 grams per liter water soluble mineral salt concentration, into an oil reservoir having a calcium sulfate content and simultaneously producing a displaced oil from a production well, the improvement which comprises removing the bivalent metallic chloride concentration from the brine prior to its injection into the oil reservoir by treatment of the brine with a water soluble metallic hydroxide which precipitates the adverse bivalent metals so as to minimize calcium sulfate deposition in the reservoir and production well.

3. The method of claim 2 in which the hydroxide is barium hydroxide.

4. The process of claim 2 in which the brine from the subterranean formation originally has a salt concentration less than 240 grams per liter water soluble mineral salt concentration and further comprising introducing additional salt into the brine to maintain at least about a 240 grams per liter salt concentration in the brine injected into the oil reservoir.

5. In a process for the secondary recovery of oil comprising injecting brine from a subterranean formation, said brine containing an adverse bivalent metallic chloride concentration which aids gypsum formation and having at least about a 240 grams per liter water soluble mineral salt concentration, into an oil reservoir having a calcium sulfate content and simultaneously producing displaced oil from a production well, the improvement which comprises neutralizing the adverse bivalent metallic chlorides by chemical means so as to minimize calcium sulfate deposition in the reservoir and production well.

6. The method of claim 5 in which the bivalent metallic chloride concentration is neutralized by the addition of sodium bicarbonate to the brine.

7. The method of claim 6 in which the sodium bicarbonate concentration of the brine is about 0.5 to 5.0 grams per liter.

8. The method of claim 5 in which the bivalent metallic chloride concentration is neutralized by the addition of sodium bicarbonate to the brine.

9. The method of claim 8 in which the sodium bicarbonate concentration of the brine is about 0.5 to 5.0 grams per liter.

10 The process of claim 5 in which the brine from the subterranean formation originally has a salt concentration less than 240 grams per liter water soluble mineral salt and further comprising introducing additional salt into the brine to maintain at least about a 240 grams per liter salt concentration in the brine injected into the oil reservoir.

11. In a process for the secondary recovery of oil comprising injecting a brine from a subterranean formation, such brine having a total salt concentration of less than 240 grams per liter, into an oil reservoir having a calcium sulfate content and simultaneously producing displaced oil from a production well, the improvement which comprises introducing additional salt into the brine to maintain at least about a 240 grams per liter salt concentration in the brine injected into the oil reservoir and in which the additional salt added includes sodium chloride up to a total sodium chloride concentration of at least about 170 grams per liter and sodium sulfate up to a total sodium sulfate concentration of at least about 63 grams per liter.

12. The method of claim 11 in which the hydroxide is barium hydroxide.